(12) United States Patent
Vander Lind et al.

(10) Patent No.: US 10,153,636 B1
(45) Date of Patent: Dec. 11, 2018

(54) ELECTRIC VEHICLE HYBRID BATTERY SYSTEM

(71) Applicant: Kitty Hawk Corporation, Mountain View, CA (US)

(72) Inventors: Damon Vander Lind, Oakland, CA (US); George James Hansel, San Francisco, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/607,250

(22) Filed: May 26, 2017

(51) Int. Cl.
| | | |
|---|---|---|
| B60L 1/00 | (2006.01) | |
| B60L 3/00 | (2006.01) | |
| H02G 3/00 | (2006.01) | |
| H02J 1/10 | (2006.01) | |
| B64D 27/24 | (2006.01) | |
| H01M 2/10 | (2006.01) | |
| H01M 10/44 | (2006.01) | |
| H01M 2/20 | (2006.01) | |
| H02J 7/00 | (2006.01) | |
| B64C 29/00 | (2006.01) | |
| H02J 7/14 | (2006.01) | |
| H02J 7/34 | (2006.01) | |

(52) U.S. Cl.
CPC .............. *H02J 1/10* (2013.01); *B64C 29/00* (2013.01); *B64D 27/24* (2013.01); *H01M 2/1077* (2013.01); *H01M 2/206* (2013.01); *H01M 10/441* (2013.01); *H02J 7/0063* (2013.01); *H02J 7/0068* (2013.01); *H02J 7/1423* (2013.01); *H02J 7/34* (2013.01); *H01M 2220/20* (2013.01)

(58) Field of Classification Search
CPC ........... H01M 2220/20; H01M 2/1077; H01M 10/441; H02J 7/0063; H02J 7/1423; H02J 7/34; H02J 1/10; B64C 29/00
See application file for complete search history.

(56) References Cited

U.S. PATENT DOCUMENTS

| | | | |
|---|---|---|---|
| 2004/0201365 A1* | 10/2004 | Dasgupta | ............ B60L 11/1809 320/116 |
| 2006/0216585 A1 | 9/2006 | Lee | |
| 2011/0185736 A1* | 8/2011 | McKinney | ................ F23R 3/06 60/752 |
| 2011/0260544 A1 | 10/2011 | Imai | |
| 2014/0011076 A1 | 1/2014 | Kanemoto | |

(Continued)

FOREIGN PATENT DOCUMENTS

WO     WO2017113338     7/2017

*Primary Examiner* — Rexford Barnie
*Assistant Examiner* — Rasem Mourad
(74) *Attorney, Agent, or Firm* — Van Pelt, Yi & James LLP

(57) ABSTRACT

An electrically-powered vehicle comprising a hybrid battery system is disclosed. The vehicle comprises a motor and a hybrid battery system coupled to the motor. The hybrid battery system comprises a first battery of a first energy density and a first power density and a second battery in parallel with the first battery. The second battery has a second energy density lower than the first energy density and a second power density greater than the first power density. The vehicle is configured to draw power disproportionally from the first battery in a first mode and disproportionally from the second battery in a second mode.

16 Claims, 12 Drawing Sheets

(56) References Cited

U.S. PATENT DOCUMENTS

| | | | |
|---|---|---|---|
| 2014/0186659 A1* | 7/2014 | Dhar | H01M 16/00 |
| | | | 429/9 |
| 2014/0265554 A1 | 9/2014 | Yang et al. | |
| 2015/0202984 A1* | 7/2015 | Wyatt | B60L 11/1868 |
| | | | 320/109 |
| 2015/0354453 A1* | 12/2015 | Hanrahan | F02C 7/05 |
| | | | 60/772 |
| 2016/0072107 A1* | 3/2016 | Farha | B60K 6/28 |
| | | | 318/139 |
| 2016/0214712 A1* | 7/2016 | Fisher | B64C 39/024 |
| 2016/0221683 A1 | 8/2016 | Roberts et al. | |
| 2016/0340035 A1 | 11/2016 | Duru | |
| 2016/0380315 A1* | 12/2016 | Weicker | H01M 10/441 |
| | | | 320/136 |
| 2017/0008627 A1 | 1/2017 | De Soto | |
| 2017/0057650 A1* | 3/2017 | Walter-Robinson | |
| | | | B64D 41/00 |
| 2017/0072812 A1 | 3/2017 | Von Novak et al. | |
| 2017/0197700 A1* | 7/2017 | Wainfan | B64C 3/32 |
| 2017/0203850 A1* | 7/2017 | Wang | B64D 27/24 |
| 2017/0240291 A1* | 8/2017 | Kim | B64C 39/024 |

\* cited by examiner

ELECTRIC VEHICLE HYBRID BATTERY SYSTEM

BACKGROUND OF THE INVENTION

In vertical take-off and landing (VTOL) aircraft, large amounts of power are applied at the start and end of flight to enable the aircraft to take off and land in a short distance. In an electric VTOL aircraft, a battery or battery system must sustain the aircraft for the entirety of flight as well as supply surges of power during take-off and landing. A high energy density battery may be used to provide a cost-effective and weight-effective solution to powering an aircraft. A high energy density battery may not be capable of supplying the power needed for vertical take-off or landing without sustaining damage to the battery. Towards the end of flight, a typical high energy density battery may output too low of a voltage for a vertical landing.

BRIEF DESCRIPTION OF THE DRAWINGS

Various embodiments of the invention are disclosed in the following detailed description and the accompanying drawings.

DETAILED DESCRIPTION

Figure 1:
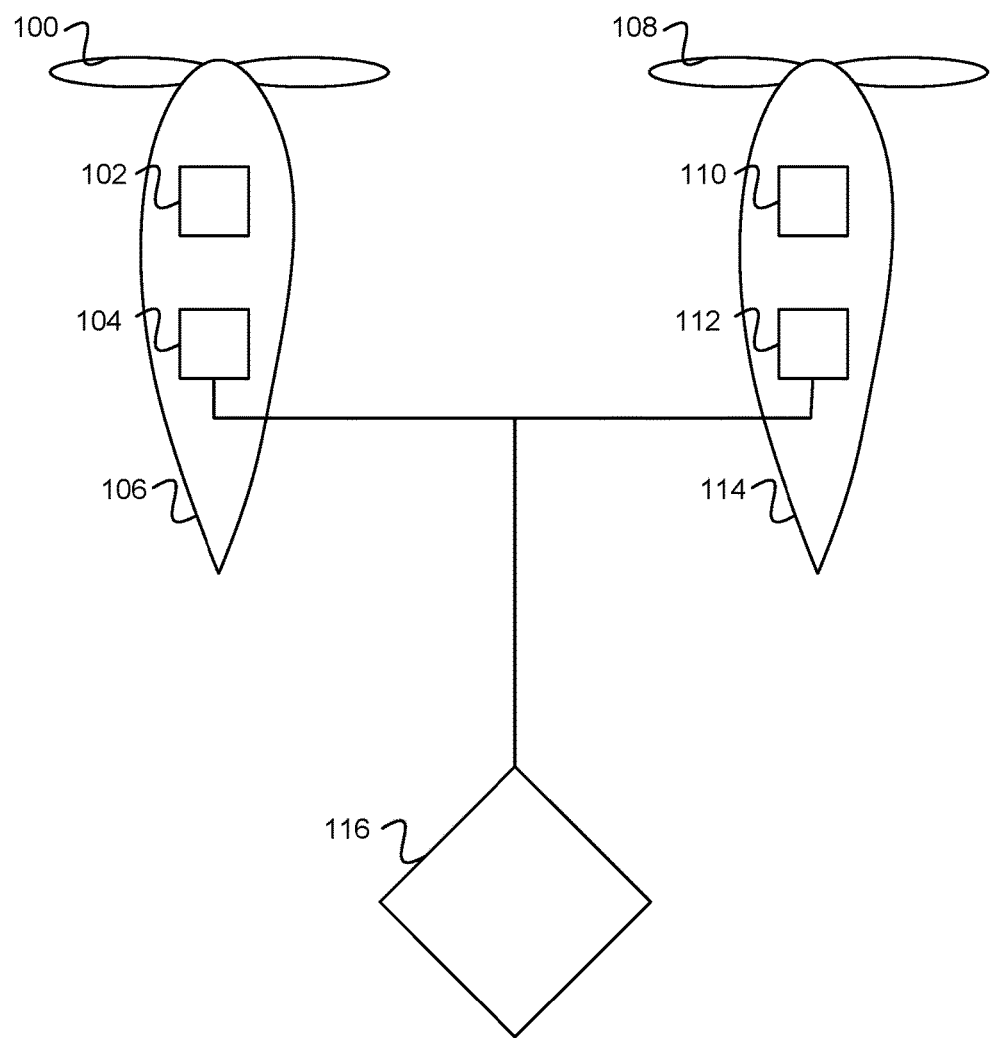
FIG. 1 is a diagram illustrating an embodiment of a hybrid battery system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An electrically-powered vehicle comprising a hybrid battery system is disclosed. The vehicle comprises a motor and a hybrid battery system coupled to the motor. The hybrid battery system comprises a first battery of a first energy density and a first power density and a second battery in parallel with the first battery. The second battery has a second energy density lower than the first energy density and a second power density greater than the first power density. The vehicle is configured to draw power disproportionally from the first battery in a first mode and is configured to draw power disproportionally from the second battery in a second mode.

In a hybrid battery system, two different types of batteries are used to power an electric aircraft in combination or separately. During steady state flight, a high energy density battery may be used. A high energy density battery may efficiently provide the low amounts of power needed to sustain cruise in the aircraft. Towards the end of flight, the high energy density battery may be drained and output a voltage too low to sustain a vertical or power-intensive landing. At or close to landing, the aircraft's main source of power changes to a second type of battery. The second type of battery may comprise a power dense battery with a high discharge rate, wherein the battery is capable of sustaining a large current.

Common cost-effective high energy density batteries may have low discharge rates. They are able to sustain low currents for long periods of time but cannot sustain high currents without incurring damage. For the purposes of the application, energy dense battery, high energy density battery and low discharge rate battery are used interchangeably to refer to a high energy density, low power density battery. Common cost-effective power dense batteries may have low energy densities. Power dense battery and high discharge rate battery refer to a low energy density, high power density battery (e.g. relative to an energy dense battery). In some embodiments, an energy dense battery or a power dense battery used in a hybrid battery system is rechargeable.

FIG. 1 is a diagram illustrating an embodiment of a hybrid battery system. In some embodiments, the hybrid battery system comprises an energy dense battery that is placed centrally in an aircraft and one or more power dense batteries that are placed near motors of the aircraft. In the example shown, central battery 116, outboard battery 104, and outboard battery 112 are wired together. The batteries may power motors 102 and 110, which are wired to propellers 100 and 108 respectively. Outboard battery 104 is positioned along with motor 102 within pod 106, on which propeller 100 is installed. Outboard battery 112 is positioned along with motor 110 within pod 114, on which propeller 108 is installed. Central battery 116 as shown is positioned outside of the pods and away from the motors.

Figure 2:
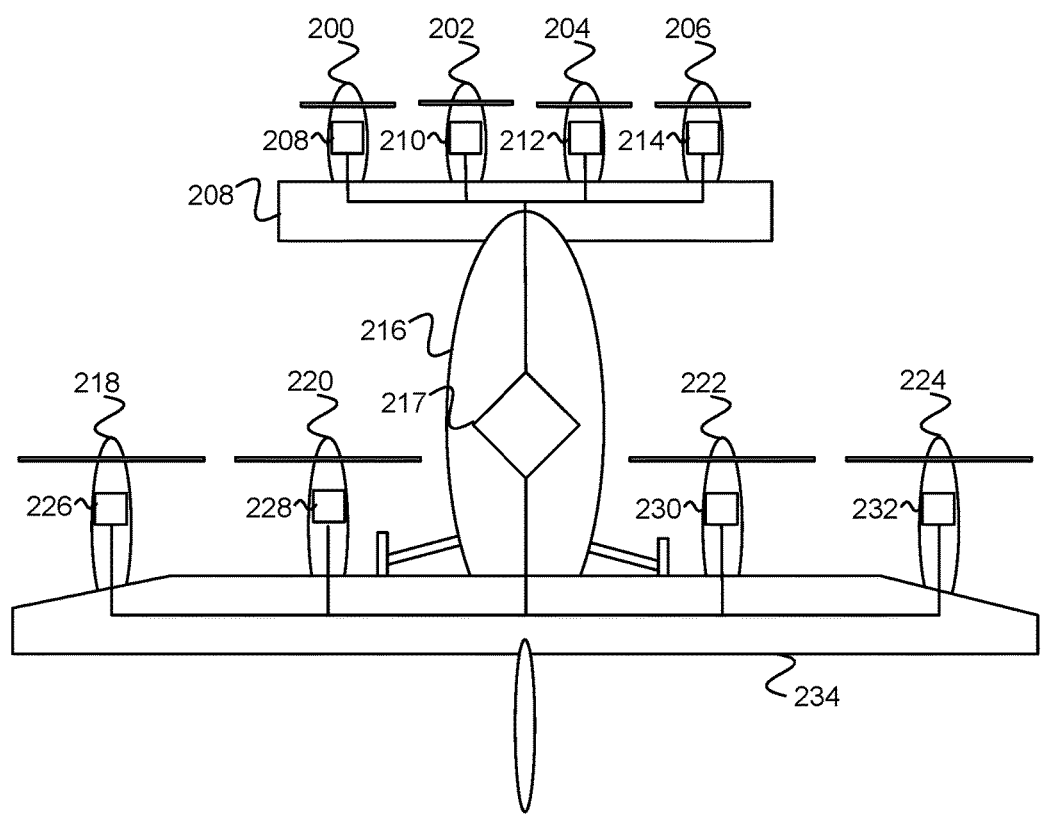
FIG. 2 is a diagram illustrating an embodiment of an aircraft that utilizes a hybrid battery system.

FIG. 2 is a diagram illustrating an embodiment of an aircraft that utilizes a hybrid battery system. As shown, central battery 217 is positioned in the fuselage of aircraft 216. Front wing 208 comprises propellers extending from pods 200, 202, 204, and 206. Outboard batteries 208, 210, 212, and 214 are stored in pods 200, 202, 204 and 206 respectively. Back wing 234 also comprises four propellers. Each of pods 216, 220, 222, and 224 comprise a propeller, a motor, and an outboard battery (batteries 226, 228, 230, and 232 respectively). As shown, the central and outboard batteries are wired together. In some embodiments, the batteries are connected to a shared bus.

Central battery 217 may comprise an energy dense battery whereas the outboard batteries comprise power dense batteries. The outboard batteries may be capable of providing enough power to land the aircraft in the absence of the central battery. Each individual outboard battery may be capable of supplying enough power to sustain its corresponding motor through a landing, allowing each pod to operate independently. The distributed positioning of the outboard batteries may decrease chances of a single trauma affecting the aircraft's ability to land. In some embodiments, the aircraft is over-actuated (e.g. the aircraft is able to maintain controlled flight with fewer rotors than it possesses) and distributing the batteries takes advantage of the over-actuated design.

Retaining a central battery may enable the hybrid battery system to stay within weight constraints as opposed to distributing all batteries. The outboard batteries may provide a form of redundancy by providing boosts of power during launch and landing, when the central battery may need to be supplemented.

In various embodiments, a power dense battery and an energy dense battery are placed centrally in an aircraft, a power dense battery and an energy dense battery are positioned outboard in an aircraft, a power dense battery and an energy dense battery are placed in a same location in an aircraft, a power dense battery and an energy dense battery are placed in different locations in an aircraft, or any appropriate configuration.

In some embodiments, the hybrid battery system is used to power the flight control assets of the aircraft, which may include one or more of control surfaces, such as rudders, ailerons, elevators, etc.; sources of forward thrust, such as propellers or jet engines; powered sources of lift such as rotors or lift fans; and forces capable of being directed or otherwise controlled or concentrated through use of nozzles, diverters, physical structures onto which engine or fan thrust may be directed, such as vanes, etc. and/or rotation of thrust generating devices.

Figure 3:
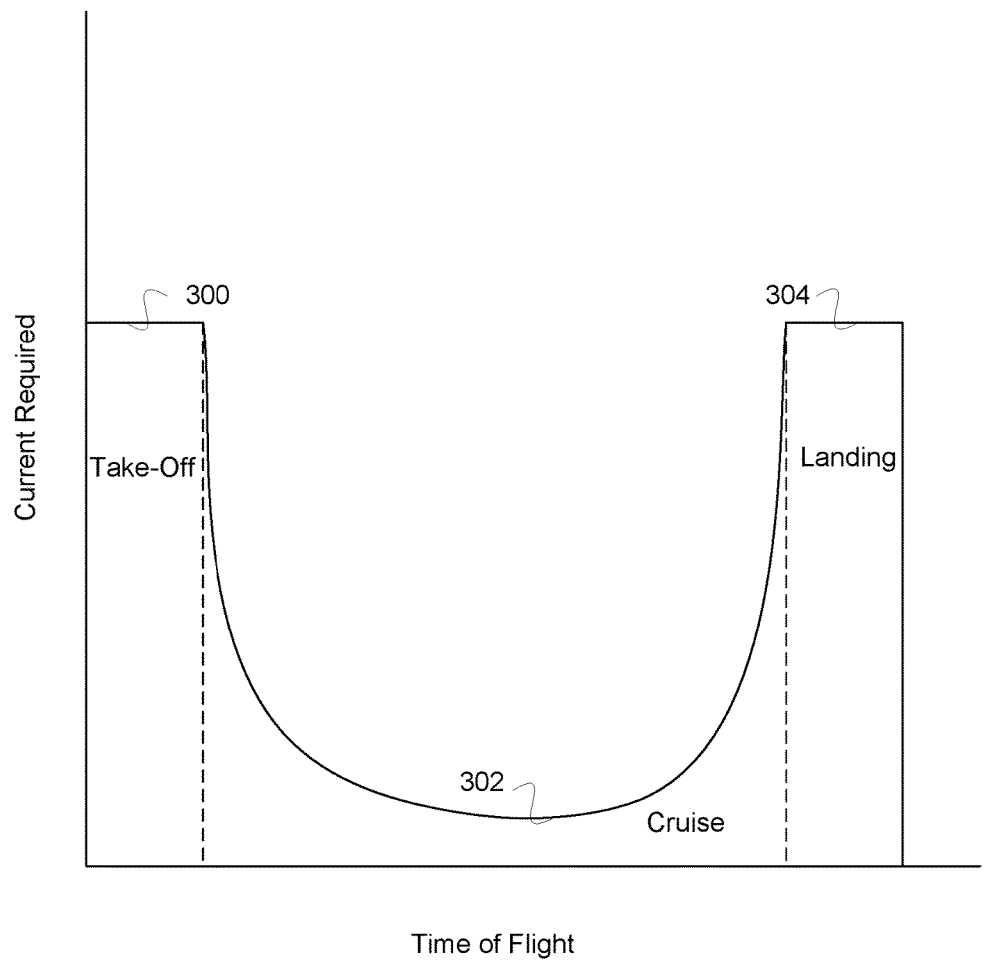
FIG. 3 is a diagram illustrating an embodiment of aircraft current requirements during flight.

FIG. 3 is a diagram illustrating an embodiment of aircraft current requirements during flight. The diagram shown graphs current required by the aircraft against time of flight. During period 300, take-off, the current required is at a peak level. The current required dips and is low during cruise until peaking again during landing period 304. As shown, the aircraft is in cruise for the majority of flight.

Figure 4:
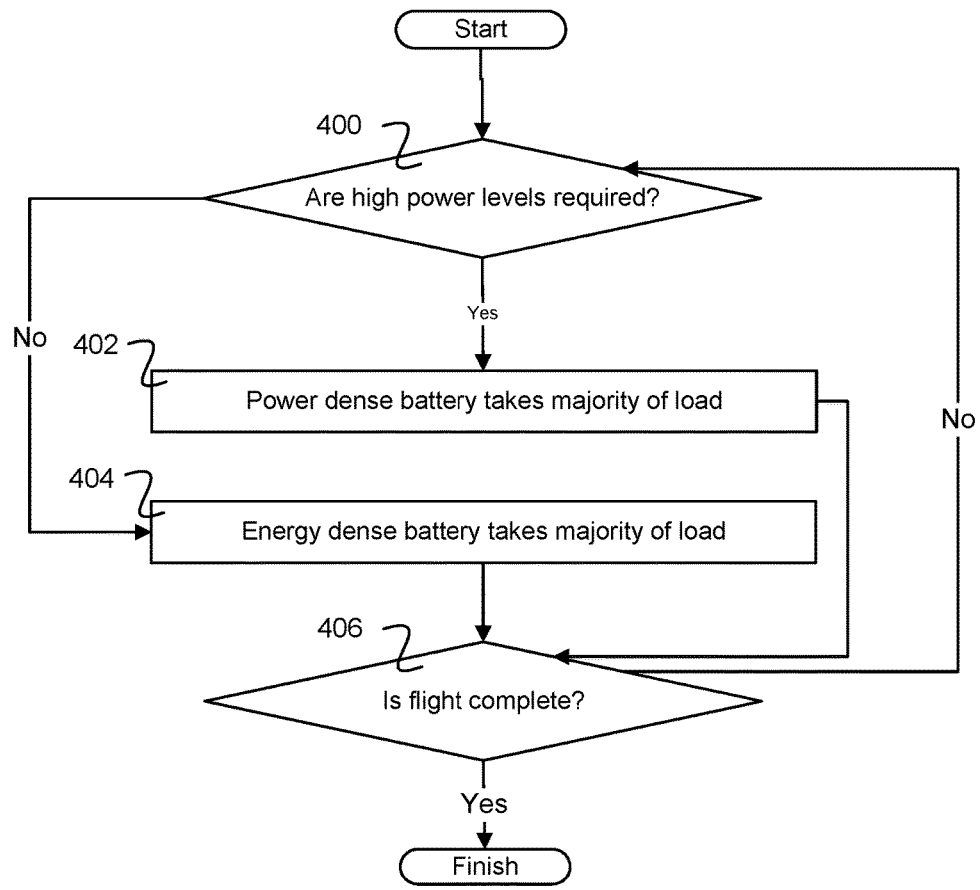
FIG. 4 is a flow diagram illustrating an embodiment of a hybrid battery process.

FIG. 4 is a flow diagram illustrating an embodiment of a hybrid battery process. At 400, it is determined whether high power levels are required. In the event high power levels are required, at 402 the power dense battery takes the majority of the load. For example, the power dense battery supplies a higher current than the energy dense battery does to a shared bus. The power dense batteries may be capable of putting out high currents without sustaining damage, unlike energy dense batteries. In the event high power levels are not required, at 404 the energy dense battery takes the majority of the load. Using an energy dense battery in the event high power levels are not required may be efficient or cost-effective. Following 402 or 404, it is determined at 406 whether flight is complete (e.g. whether the aircraft has landed). In the event flight is not complete, subsequent iterations of the process are repeated.

In various embodiments, the main load is shifted between the two types of batteries using various methods. The shifting of the load between the types of batteries may be achieved by utilizing or manipulating electrical switches, battery cell geometry, battery cell quantities, battery positioning in the system, or battery cell chemistry.

In some embodiments, the power dense battery takes the majority of the load only in the event that high power levels are required and the energy dense battery is unable to supply the required power. In some embodiments, the power dense battery and energy dense battery share the load during take-off, when high power levels are required and both types of batteries are fully charged. As the batteries are drained and reach a lower percentage of charge later in flight, such as during landing, the energy dense battery may experience a voltage drop under high loads, causing the power dense battery to take the majority of the load when high power levels are required.

Figure 5:
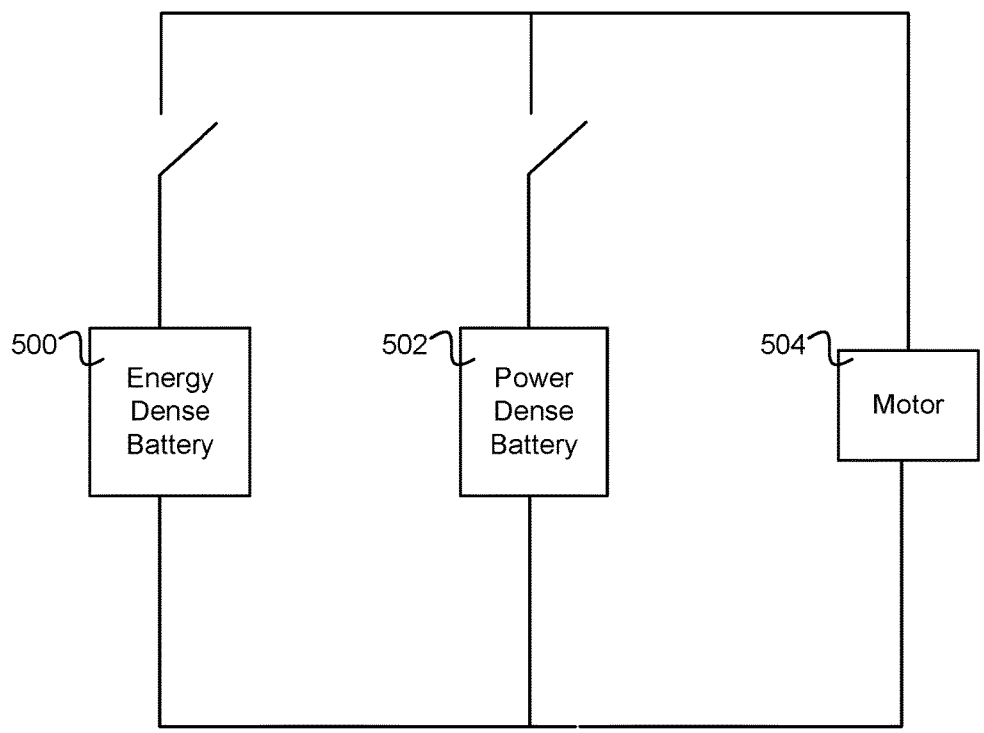
FIG. 5 is a diagram illustrating an embodiment of a hybrid battery system with switches.

FIG. 5 is a diagram illustrating an embodiment of a hybrid battery system with switches. Energy dense battery 500, power dense battery 502, and motor 504 are in parallel. In some embodiments, multiple power dense batteries and multiple motors are in parallel with an energy dense battery. Energy dense battery 500 and power dense battery 502 may sit at the same voltage in steady state because they are in parallel. The batteries may supply current relative to their impedances. Motor 504 or any appropriate load is powered by the supplied current. The batteries are wired to a shared bus, wherein the motor and any additional motors or actuators draw current from the shared bus.

Current may tend to flow from local outboard batteries to their respective local motors due to wire resistance. In some embodiments, throttling a motor up causes it to draw current from all batteries whereas throttling it down causes its respective outboard battery to put some current on the bus. As shown, each battery has a switch. The energy dense battery and power dense battery may be switched into or out of the circuit depending on which is needed or desired to be used.

Figure 6:
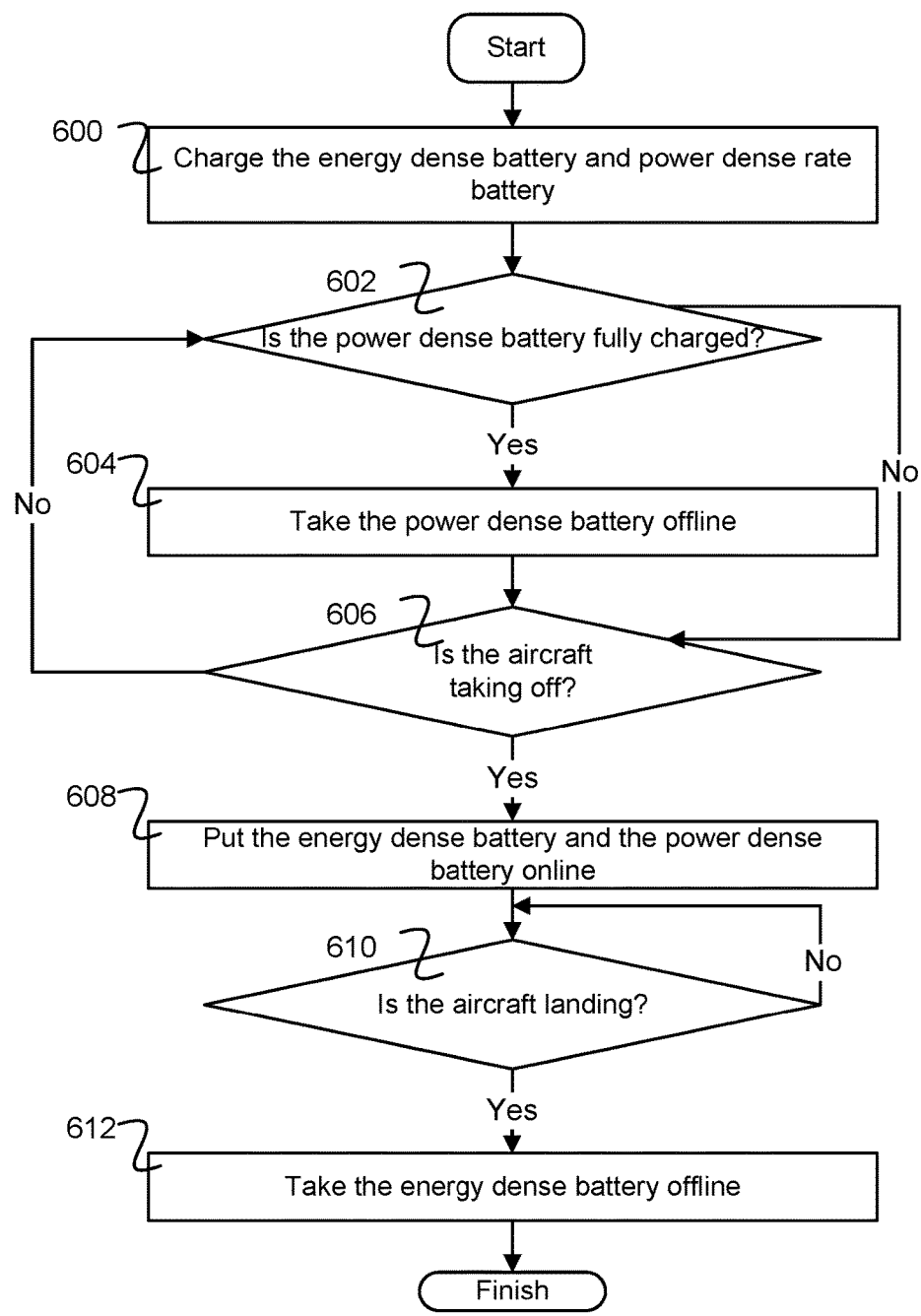
FIG. 6 is a flow diagram illustrating an embodiment of a process to switch batteries in a hybrid battery system.

FIG. 6 is a flow diagram illustrating an embodiment of a process to switch batteries in a hybrid battery system. In some embodiments, the energy dense battery is switched out and the power dense battery switched in during take-off and landing while the energy dense battery is switched in and the power dense battery switched out during steady-state flight (e.g. cruise). Switching may be done to ensure the power dense battery powers the aircraft during take-off and landing and the energy dense battery powers the aircraft during steady state flight.

In some embodiments, fewer switches are performed and the two types of batteries are simultaneously online during specific periods of flight. In some embodiments, switching is not required to shift the load between the two batteries due to the energy dense battery's voltage drop under high load. Switching may be performed as a safeguard to protect a battery from damage.

At 600, the energy dense battery and the power dense battery are charged. The aircraft at this point in the process is grounded and may be attached to an external power source. At 602, it is determined whether the power dense battery is fully charged. In the event the power dense battery is fully charged, at 604 the power dense battery is taken offline. The power dense battery may have a lower energy density than the energy dense battery, causing the power dense battery to become fully charged in a shorter time. The power dense battery may be removed to prevent it from being overcharged, which can cause damage.

In the event the power dense battery is taken offline or is not fully charged, at 606 it is determined whether the aircraft is taking off. In the event the aircraft is not taking off, the process returns to 602. In the event the aircraft is taking off, at 608 the energy dense battery and the power dense battery are put online. In this example, both batteries are used simultaneously. The majority of the load may be taken by the energy dense battery. Following take-off, the aircraft may enter a cruise state. During cruise, the energy dense battery may take the majority of the load. The energy dense battery may take the majority of the load while it is at a highly charged state (e.g. 100 to 50 percent charged). At 610, it is determined whether the aircraft is landing. When it is determined that the aircraft is landing, at 612 the energy dense battery is taken offline. The energy dense battery may be taken offline to prevent it from being damaged and ensure that the load is taken by the power dense battery. In the event that the energy dense battery is at a low charged state and high power is required (as is expected during landing of a VTOL aircraft), the energy dense battery may fail to provide the required power, requiring the presence of a power dense battery.

In some embodiments, switching is not required because the load is passively shifted between the two types of batteries due to their characteristics. An energy dense battery may experience a larger voltage drop than a power dense battery under a high load, causing the power dense battery to take on the majority of the load.

Figure 7A:
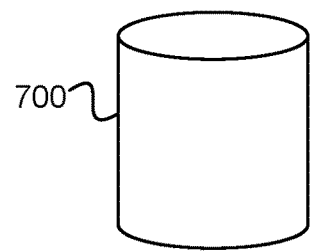
FIG. 7A is a diagram illustrating an embodiment of a cylindrical battery.

FIG. 7A is a diagram illustrating an embodiment of a cylindrical battery. A cylindrical battery may be used in a hybrid battery system as an energy dense battery or central battery. A common example of a cylindrical battery is an 18650 cell. Cylindrical batteries have extremely high energy content. However, it is difficult to achieve a high discharge rate or high power level with a cylindrical battery. Cylindrical batteries tend to cheap to manufacture and acquire.

Figure 7B:
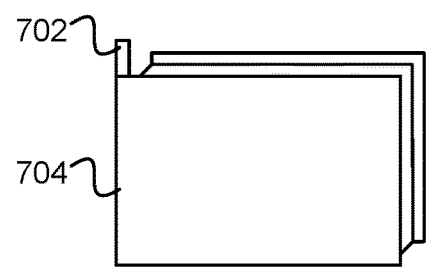
FIG. 7B is a diagram illustrating an embodiment of a cylindrical battery in unrolled form.

FIG. 7B is a diagram illustrating an embodiment of a cylindrical battery in unrolled form. In the example shown, battery 704 comprises a layer of cathode and a layer of anode with an electrolyte in between. Current transfers through tab 702.

Figure 7C:
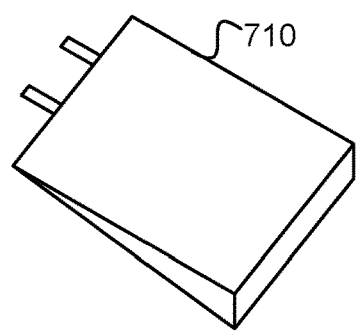
FIG. 7C is a diagram illustrating an embodiment of a pouch battery.

FIG. 7C is a diagram illustrating an embodiment of a pouch battery. A pouch battery may be used in a hybrid battery system as a power dense battery. Pouch battery 710 as shown is a relatively flat shape. A pouch battery have a high discharge rate but is less efficient at storing energy as compared to a cylindrical battery. The majority of flight may be powered using a cheap, easily replaceable 18650 battery while pouch cells provide needed punches of power.

Figure 8:
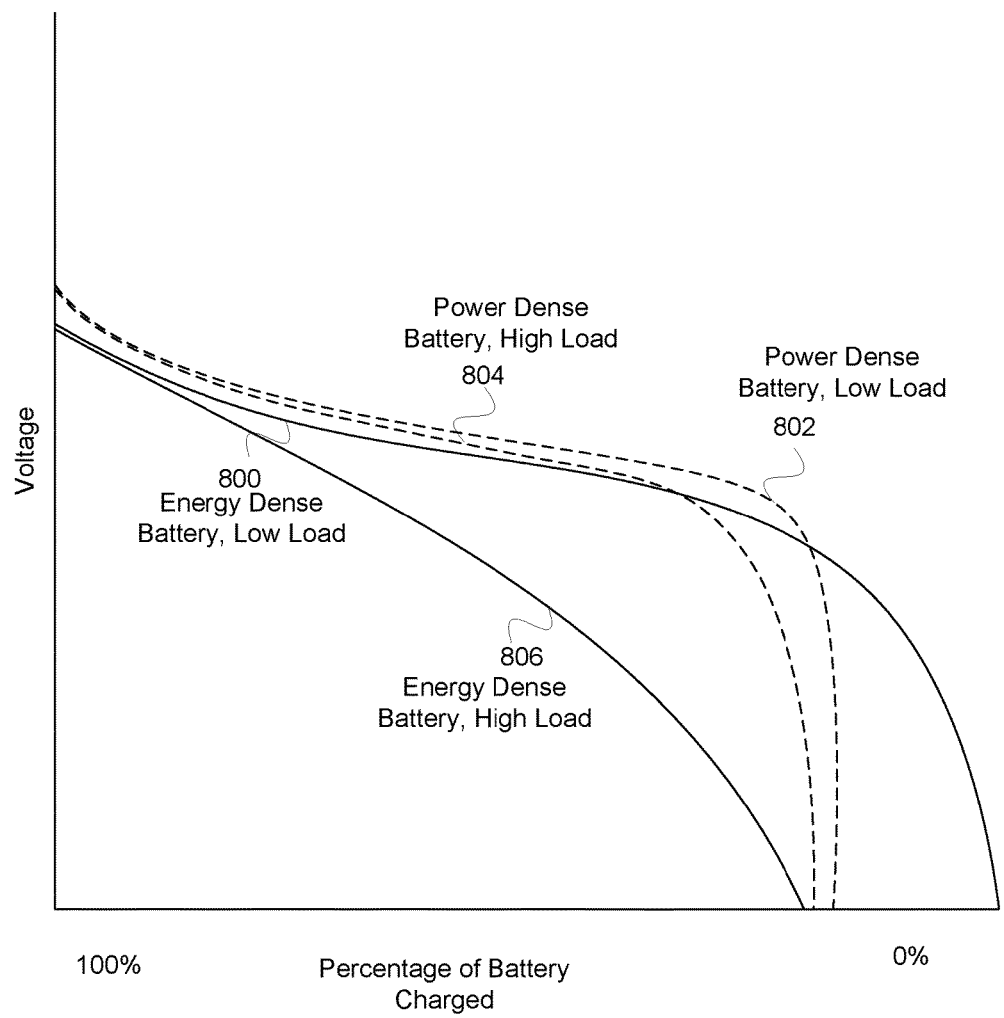
FIG. 8 is a diagram illustrating an embodiment of cylindrical battery and pouch battery voltage curves.

FIG. 8 is a diagram illustrating an embodiment of cylindrical (energy dense) battery and pouch (power dense) battery voltage curves. The graph displays voltage against battery percentage of the two batteries. The voltage refers to the voltage of the shared bus and of the batteries, wherein the batteries are in parallel. The voltage curves of the batteries differ due to the different geometries of the batteries. The voltage curves shown may exemplify battery performance in the event that only one battery is present (e.g. curve 800 shows how an energy dense battery would perform alone).

Assuming similar chemistry, a cylindrical battery and a pouch battery may have similar voltage curves or the same voltage curve at a high charge percentage and under low load (e.g. supplying 1 Amp). However, under a high load (e.g. supplying 10 Amps), the voltage of the energy dense battery droops far more than the voltage of the power dense battery. Due to the voltage drop of the energy dense battery, the power dense battery may take more of the load or supply a higher current than the energy dense battery under a high load.

As shown, voltage curve 800 is the voltage curve of an energy dense battery under a low load. Voltage curve 806 shows an energy dense battery under a high load. Under a high load, the voltage droops considerably. Voltage curve 802, which shows a power dense battery under a low load, also droops under a high load as shown by voltage curve 804 (power dense battery under a high load). However, it does not droop as much due to the geometry of the battery.

Figure 9:
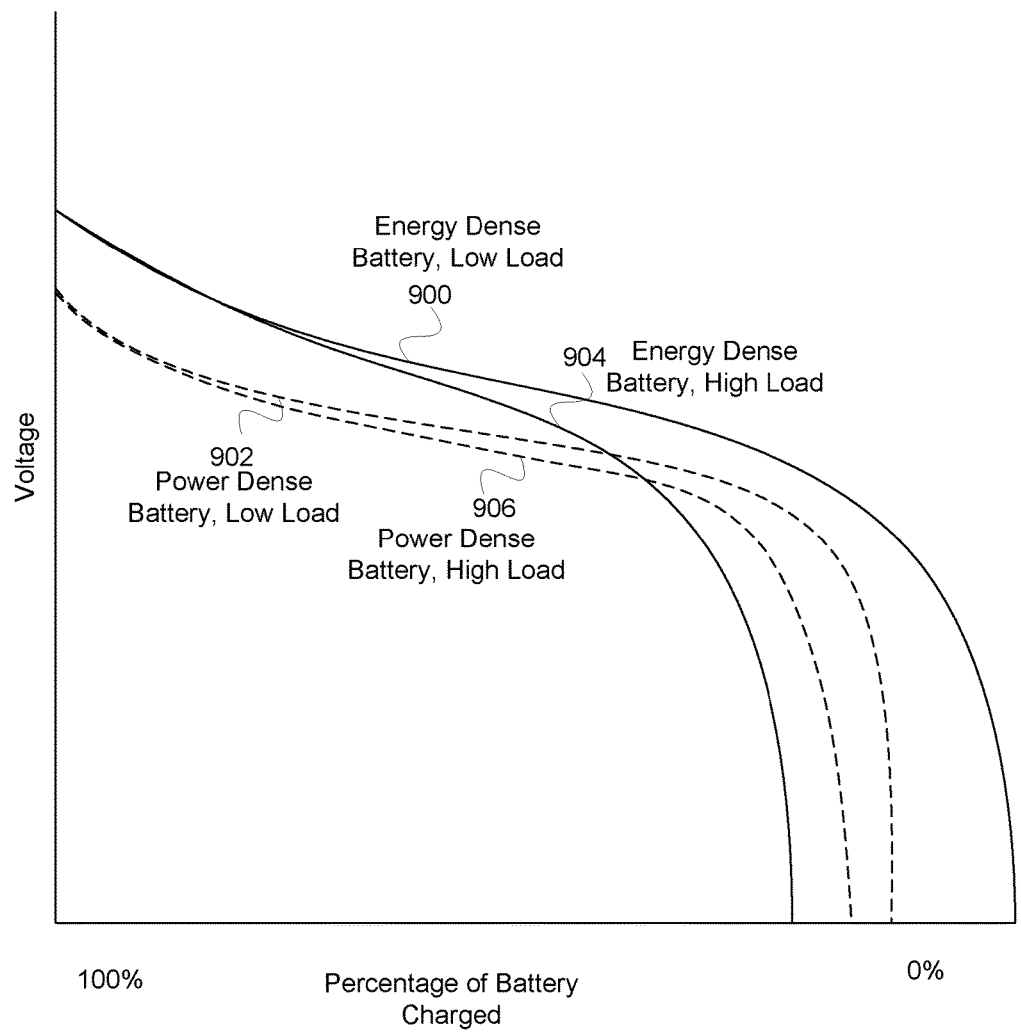
FIG. 9 is a diagram illustrating an embodiment of cylindrical battery and pouch battery voltage curves under varying cell counts.

FIG. 9 is a diagram illustrating an embodiment of cylindrical (energy dense) battery and pouch (power dense) battery voltage curves with varying cell counts. An energy dense battery used in a hybrid battery system may have a higher battery cell count than a power dense battery used in the system in order to prevent the power dense battery from being used up before landing. In the example shown, the voltage curve of an energy dense battery under a low load (curve 900) is situated above the voltage curve of a power dense battery under a low load (curve 902). The energy dense battery pack may comprise more battery cells than the power dense battery pack, causing the energy dense battery voltage curve to be at a higher voltage when both battery packs are 100% charged. In steady state, the voltages of the energy dense battery pack and the power dense battery pack are equal. Under steady state (e.g. low load), the energy dense battery may provide more power (e.g. supply a higher current) than the power dense battery due to the offset between the voltage curves (e.g. 900 and 902). The energy dense battery will discharge faster and supply more current than the power dense battery pack.

The power dense battery pack is at a lower stage of discharge as compared to the energy dense battery pack when the voltages of the packs are equal, due to the uneven number of cells. When a high discharge rate is applied to the battery packs (e.g. a high load), both voltage curves droop as shown with curves 904 (energy dense battery under a high load) and 906 (power dense battery under a high load). The pouch battery is at a lower state of discharge and it droops less. Curves 904 and 906 cross as shown, with the power dense battery curve above the energy dense battery curve. The power dense battery will provide the majority of the power under a high load when the energy dense battery is reaching a low charged percentage.

Figure 10:
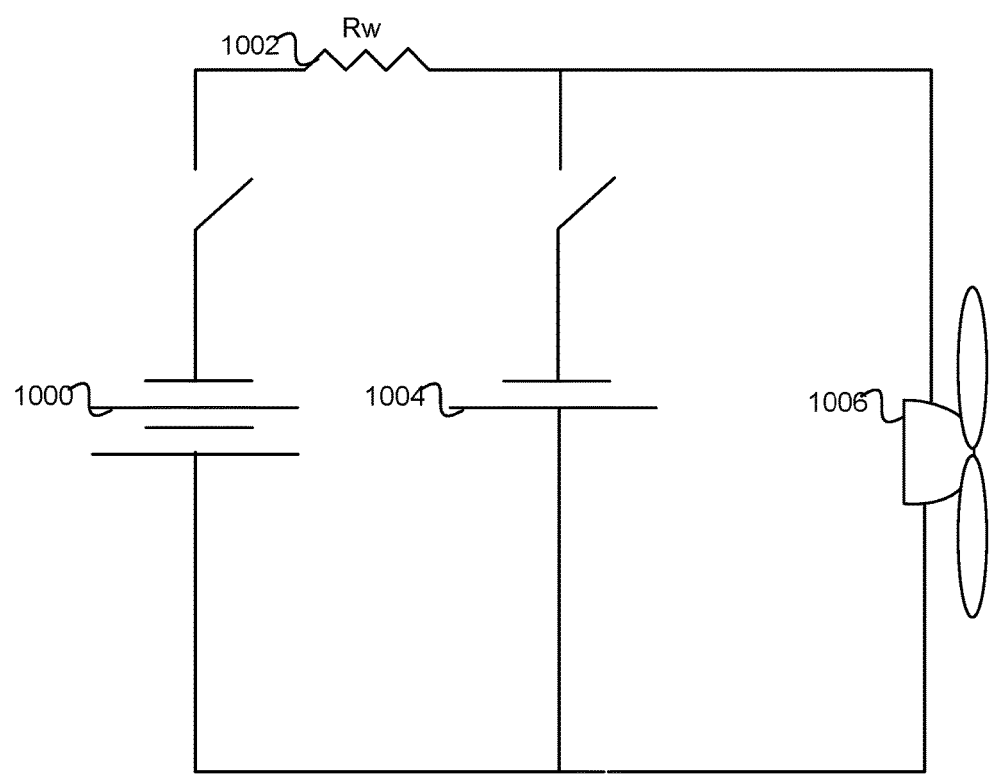
FIG. 10 is a diagram illustrating an embodiment of hybrid battery system with wire resistance.

FIG. 10 is a diagram illustrating an embodiment of hybrid battery system with wire resistance. The two types of batteries may be located on the aircraft in positions that take advantage of wire resistance. In the example shown, energy dense battery 1000, power dense battery 1004, and motor 1006 are in parallel. Wire resistance 1002 is represented as Rw. Energy dense battery 1000 may be positioned far from power dense battery 1004, with many lengths of wire between. The wire or wire harness may cause a voltage drop (e.g. up to 2%) under high loads when current is drawn from the energy dense battery. Due to the voltage drop, more power may be naturally drawn from an outboard/power dense battery when high power is needed. Under low loads, the voltage drop may be negligible, allowing the energy dense battery to take on a disproportionate amount of load.

Figure 11:
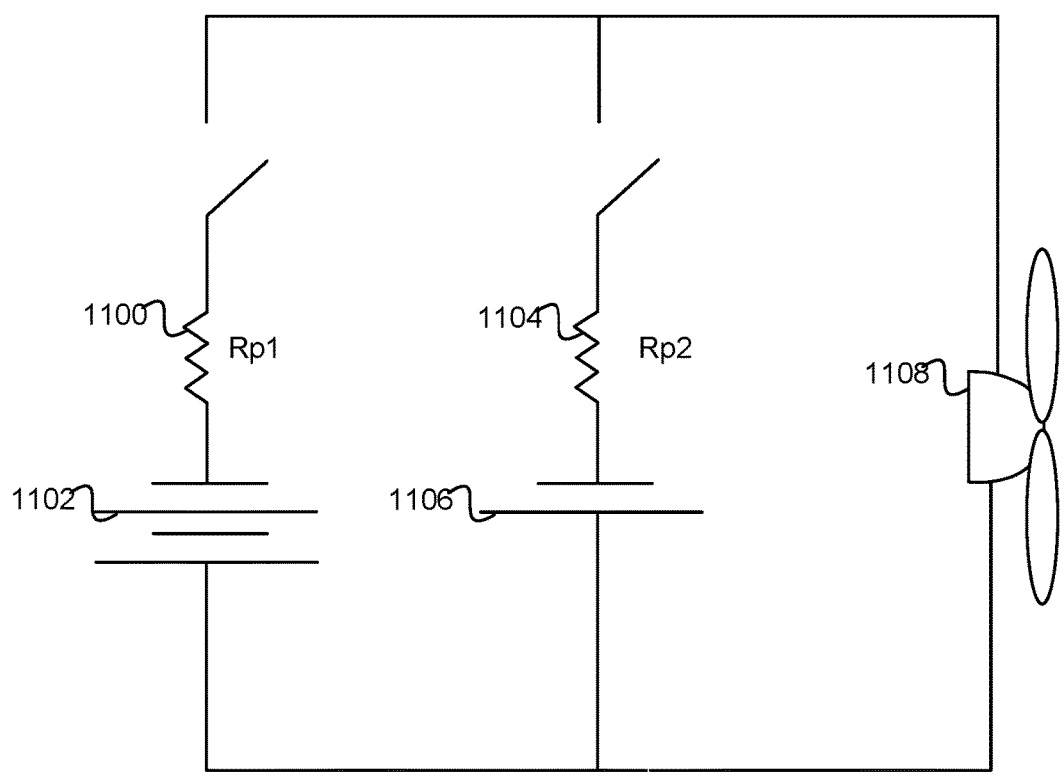
FIG. 11 is a diagram illustrating an embodiment of hybrid battery system with battery pack resistance.

FIG. 11 is a diagram illustrating an embodiment of hybrid battery system with battery pack resistance. The energy dense battery may be designed to have more resistance in the pack as compared to the power dense battery to cause the energy dense battery to supply less power than the power dense battery under high loads. In the example shown, energy dense battery 1102, power dense battery 1106, and motor 1108 are in parallel. Battery pack resistance is represented as Rp1 for the energy dense battery and Rp2 for the power dense battery. Rp1 may be greater than Rp2.

In some embodiments, the two types of batteries comprise different cell chemistries. Electrolyte type, anode type, cathode type, electrolyte thickness, or component concentrations may be changed in order to produce desired battery packs. Cell chemistries may be adjusted to cause the voltage curves of battery packs to appear as in FIG. 11.

Figure 12:
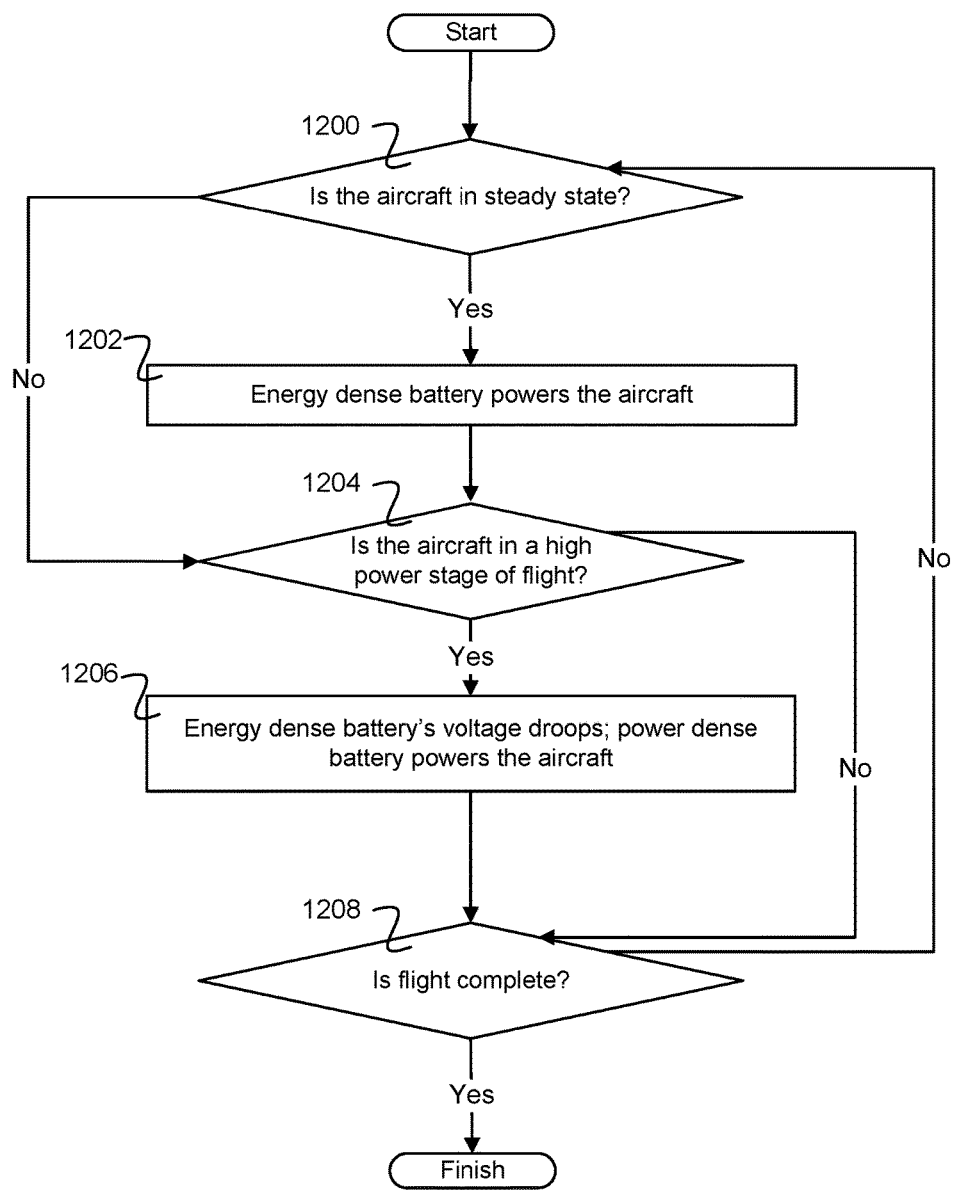
FIG. 12 is a flow diagram illustrating an embodiment of a process to shift load between batteries in a hybrid battery system.

FIG. 12 is a flow diagram illustrating an embodiment of a process to shift load between batteries in a hybrid battery system. The load may be shifted due to the characteristics of the two types of battery packs under a high discharge rate. The characteristics of the two types of batteries may be carefully chosen or designed based on cell geometry, cell chemistry, cell counts, positioning, designed resistance, or any other appropriate factor. At 1200, it is determined whether the aircraft is in steady state. In the event the aircraft is in steady state, at 1202 the energy dense battery powers the aircraft. Following 1202 or in the event the aircraft is not in steady state, at 1204 it is determined whether the aircraft is in a high power stage of flight. In the event the aircraft is in a high power stage of flight, at 1206 the energy dense battery's voltage droops and the power dense battery powers the aircraft. In some embodiments, the determination at 1204 is whether the aircraft is in a high power stage of flight and the energy dense battery is at a low charge percentage. At 1208, it is determined whether flight is complete. In the event flight is not complete, the process repeats.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electrically-powered vehicle, comprising:
 a plurality of motors, each associated with a corresponding rotor powered by the motor and each motor being mounted in a housing associated specifically with the rotor powered by that motor and
 a hybrid battery system coupled to the motor, comprising:
  a first battery of a first energy density, a first power density, and a first battery pack resistance, the first battery being coupled to each of the motors in the plurality of motors and wherein the first battery is located in a central fuselage of the electrically-powered vehicle; and
  a set of batteries of a second battery type each battery in the second set being connected in parallel with the first battery to a corresponding one of the motors and being housed together with the corresponding motor in the housing associated specifically with the rotor powered by that motor wherein each battery of the second battery type has a second energy density lower than the first energy density and a second power density greater than the first power density and has a second battery pack resistance that is lower than the first battery pack resistance,
 wherein the vehicle is configured to draw power disproportionally from the first battery in a first mode and disproportionally from the batteries of the second battery type in a second mode, including by shifting load passively from the first battery to the batteries of the second battery type in the second mode, while drawing power simultaneously from both the first battery and the respective batteries of the second battery type, at least in part due to the difference between the first battery pack resistance and the second battery pack resistance.

2. The system of claim 1, wherein the first battery and the batteries of the second battery type are in parallel with a the respective motors.

3. The system of claim 1, wherein the batteries of the second battery type are stored outboard in the vehicle.

4. The system of claim 1, wherein the first mode comprises a low power mode.

5. The system of claim 1, wherein the second mode comprises a high power mode.

6. The system of claim 1, wherein the first battery and the batteries of the second battery type are switched in to or out of a shared bus.

7. The system of claim 1, wherein the first battery drops in voltage more significantly under load than the batteries of the second battery type such that greater current is drawn from the batteries of the second battery type under high load.

8. The system of claim 1, wherein the first battery has a larger battery cell count than the batteries of the second battery type y.

9. The system of claim 1, wherein the first battery comprises a cylindrical battery.

10. The system of claim 1, wherein the second battery type comprises a pouch battery.

11. The system of claim 1, wherein the vehicle comprises an aircraft.

12. The system of claim 1, wherein the vehicle comprises a vertical take-off and landing aircraft.

13. The system of claim 1, wherein the first mode comprises a cruise or steady-state flight mode and the second mode comprises take-off or landing.

14. The system of claim 12, wherein the batteries of the second battery type provide enough power to vertically land the aircraft in the absence of the first battery.

15. The system of claim 14, wherein the batteries of the second battery type are each individually capable of powering a single motor that is located near each battery, respectively.

16. The system of claim 15, wherein the batteries of the second battery type are in parallel with the first battery and the first battery provides power to the respective motors associated with each of the batteries of the second battery type and one or more additional batteries of high power densities in at least the first mode of operation.

* * * * *

UNITED STATES PATENT AND TRADEMARK OFFICE
CERTIFICATE OF CORRECTION

Page 1 of 1

PATENT NO. : 10,153,636 B1
APPLICATION NO. : 15/607250
DATED : December 11, 2018
INVENTOR(S) : Vander Lind et al.

It is certified that error appears in the above-identified patent and that said Letters Patent is hereby corrected as shown below:

In the Claims

In Column 07, Line 64, Claim 1, after "type" insert --,--.

In Column 08, Line 03, Claim 1, after "motor" insert --,--.

Signed and Sealed this
Sixteenth Day of April, 2019

Andrei Iancu
*Director of the United States Patent and Trademark Office*